April 23, 1963    J. C. MacGILL ETAL    3,086,558
PROTECTIVE SLEEVE
Filed March 7, 1960
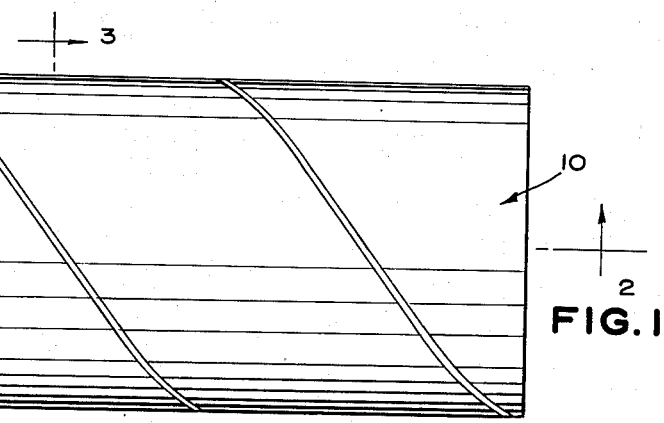
FIG. 1
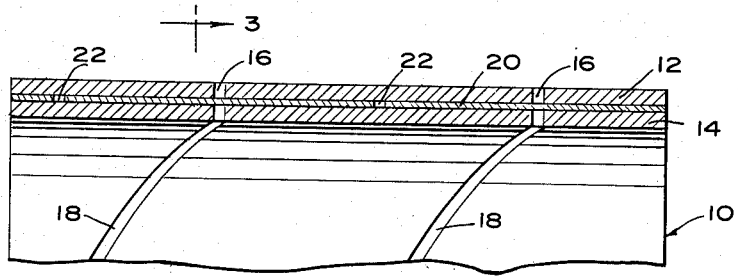
FIG. 2
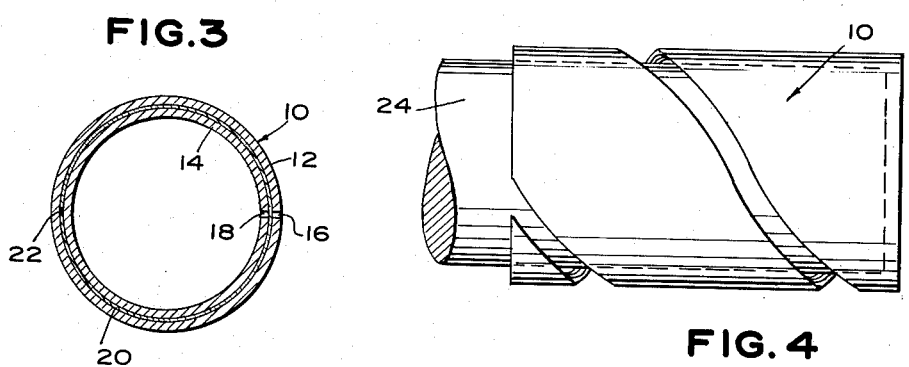
FIG. 3
FIG. 4
INVENTORS
JOHN C. MacGILL &
FRANK KOEHLER
BY
ATTORNEY

United States Patent Office 3,086,558
Patented Apr. 23, 1963

3,086,558
PROTECTIVE SLEEVE
John C. MacGill and Frank Koehler, Baltimore County, Md., assignors to Platt Corporation, a corporation of Maryland
Filed Mar. 7, 1960, Ser. No. 13,217
8 Claims. (Cl. 138—150)

The present invention relates to a protective sleeve adapted to enter into frictional engagement with work pieces of varying sizes.

It is customary to protect polished and/or machined surfaces of work pieces such as rods, shafts, pipes, and other articles until they are ultimately employed for the purposes for which they were produced. Various materials have been employed for the purpose, even including sleeves or tubes composed of metal, plastic, paper, fiberboard, paperboard and other compositions.

Where sleeves or tubes used for the protection of such surfaces have a fixed size, they can be employed only for the protection of a work piece having that exact size. Should the work piece be undersized, such a sleeve will frequently become separated, exposing the work piece to extensive damage. Where the work piece is slightly oversized, such a protective sleeve can not be applied.

Where a protective sleeve of paper or other material is produced in the form of a helix, it is subject to crushing and deformation during storage and shipment so as to render it useless, in many cases, at the time it is needed.

It is among the objects of the present invention to provide a protective sleeve which can be stored and shipped without danger of deformation and which will readily adapt itself to work pieces of varying sizes without danger of becoming dislodged. The protective sleeve contemplated herein comprises helically disposed strips of sheet material defining a plurality of concentric tubes secured together, adjacent tubes differing in shear strength and having gaps between convolutions of their strips respectively out of registry. Alternate tubes of such a sleeve have gaps between convolutions of their strips respectively in registry. It is contemplated that a tube of higher shear strength surround a tube of lower shear strength and also that a tube of lower shear strength surround a tube of higher shear strength. One of the tubes of relatively high shear strength may be composed of paper or a paper product and similarly, one of the tubes of relatively low shear strength may be composed of paper or a paper product. More specifically, it is contemplated that alternate tubes be of relatively high shear strength and have gaps between convolutions of their strips respectively in registry and a tube of relatively low shear strength be interposed between the alternate tubes and have gaps between convolutions of its strip out of registry with those of the alternate tubes. The material constituting the sleeve of the present invention is internally stressed so that it tends to retain its form when the tube of relatively low shear strength is broken in registry with the gaps between convolutions of the tubes of relatively high shear strength. In this manner, when the sleeve is applied to the work piece in the form of a helix, it will frictionally engage the surface of the work piece since the external periphery of the work piece to be protected will always be larger than the internal periphery of the sleeve prior to severance of the relatively frangible tube along the gaps between the convolutions of the tubes of relatively high shear strength.

A more complete understanding of the invention will follow a description of the accompanying drawings wherein:

FIG. 1 is a side elevation of a sleeve conforming to the present invention;

FIG. 2 is a fragmentary sectional elevation taken along line 2—2 of FIG. 1;

FIG. 3 is a sectional elevation taken along line 3—3 of FIG. 1; and

FIG. 4 is a side elevation depicting the sleeve in the form which it assumes in protecting a work piece.

The sleeve 10 as depicted in the drawings is made up of helically disposed strips of sheet material defining a plurality of concentric tubes secured together. An outer tube 12 and an inner tube 14 have gaps 16 and 18 between their convolutions respectively, in registry. Interposed between the outer tube 12 and the inner tube 14 there is an intermediate tube 20 having gaps 22 between its convolutions out of registry with the gaps 16 and 18. The intermediate tube 20 is shown as being substantially thinner than the tubes 12 and 14 to indicate that the material of the intermediate tube 20 has a lower shear strength than the material constituting the outer tube 12 and the inner tube 14.

The several tubes are secured together by a suitable adhesive, or otherwise, so that prior to the time that the intermediate tube is severed in registry with the gaps of the inner and outer tubes, the sleeve will be substantially rigid so as to resist deformation during storage, handling and shipping. When it is desired to apply the protective sleeve to a work piece 24, the tube of lower shear strength will be torn or otherwise severed in registry with the gaps 16 and 18 of the outer tube 12 and the inner tube 14 respectively, whereupon the sleeve assumes a flexible helical form so that its cross section can be expanded sufficiently to slip it over the periphery of the work piece 24. Due to the stressed condition of the sleeve by virtue of the plural plies adhesively united, it will resiliently engage any work piece having an external periphery larger than the initial internal periphery of the sleeve before its intermediate tube was severed. In this way, the sleeve will frictionally engage the work piece and retain itself in position until such time as its removal is effected deliberately.

Protective sleeves of the type disclosed herein have been employed very effectively to protect highly polished stainless steel surfaces and they are widely applicable for the protection of work pieces generally.

Only one specific form of the invention has been described with reference to the accompanying drawings, but variations of the types that will be suggested to those skilled in the art are contemplated within the scope of the appended claims.

We claim:

1. A protective sleeve comprising helically disposed strips of sheet material defining a plurality, fewer than four, of concentric single ply tubes secured together, adjacent tubes differing in shear strength and having gaps between convolutions of their strips respectively out of registry whereby said tube of lower shear strength is readily frangible between the gaps of each tube adjacent thereto.

2. A protective sleeve according to claim 1 wherein alternate tubes have gaps between convolutions of their strips respectively in registry.

3. A protective sleeve according to claim 1 wherein a tube of higher shear strength surrounds a tube of lower shear strength.

4. A protective sleeve according to claim 1 wherein a tube of lower shear strength surrounds a tube of higher shear strength.

5. A protective sleeve according to claim 1 wherein one of said tubes of relatively high shear strength is composed of paper.

6. A protective sleeve according to claim 1 wherein one of said tubes of relatively low shear strength is composed of paper.

7. A protective sleeve according to claim 1 wherein alternate tubes are of relatively high shear strength and have gaps between convolutions of their strips respectively in registry and a tube of relatively low shear strength is interposed between said alternate tubes and has gaps between convolutions of its strip out of registry with those of said alternate tubes.

8. A protective sleeve according to claim 7 wherein said sleeve is internally stressed so that it tends to retain its form when said tube of relatively low shear strength is broken in registry with the gaps between convolutions of said tubes of relatively high shear strength.

References Cited in the file of this patent

UNITED STATES PATENTS

| | | |
|---|---|---|
| 1,455,979 | Wheelwright | May 22, 1923 |
| 1,590,666 | Angell | June 29, 1926 |
| 2,315,217 | Obiglio | Mar. 30, 1943 |
| 2,751,936 | Dunlap et al. | June 26, 1956 |